US010104715B2

(12) United States Patent
Zhou et al.

(10) Patent No.: US 10,104,715 B2
(45) Date of Patent: Oct. 16, 2018

(54) COMMUNICATION METHOD AND APPARATUS AT AN UNLICENSED BAND AND SYSTEM

(71) Applicant: FUJITSU LIMITED, Kawasaki-shi, Kanagawa (JP)

(72) Inventors: Hua Zhou, Beijing (CN); Yi Zhang, Beijing (CN)

(73) Assignee: FUJITSU LIMITED, Kawsaki (JP)

( * ) Notice: Subject to any disclaimer, the term of this patent is extended or adjusted under 35 U.S.C. 154(b) by 65 days.

(21) Appl. No.: 15/466,946

(22) Filed: Mar. 23, 2017

(65) Prior Publication Data

US 2017/0195901 A1    Jul. 6, 2017

Related U.S. Application Data

(63) Continuation of application No. PCT/CN2014/087200, filed on Sep. 23, 2014.

(51) Int. Cl.
*H04W 88/02* (2009.01)
*H04W 16/14* (2009.01)
(Continued)

(52) U.S. Cl.
CPC .......... *H04W 88/02* (2013.01); *H04W 16/14* (2013.01); *H04W 24/02* (2013.01); *H04W 28/20* (2013.01);
(Continued)

(58) Field of Classification Search
CPC . H04W 16/14; H04W 28/18; H04W 36/0083; H04W 72/0426; H04W 88/02; H04L 5/14
See application file for complete search history.

(56) References Cited

U.S. PATENT DOCUMENTS 9,730,170 B2 * 8/2017 Kwak ................. H04W 56/001
2012/0304213 A1   9/2012 Lee et al.
(Continued)

FOREIGN PATENT DOCUMENTS

CN   102232307 A   11/2011
CN   102843696 A   12/2012
(Continued)

OTHER PUBLICATIONS

Notice of Preliminary Rejection issued by the Korean Intellectual Property Office for corresponding Korean Patent Application No. 10-2017-7010340, dated May 15, 2018, with English translation.
(Continued)

*Primary Examiner* — Raj Jain
(74) *Attorney, Agent, or Firm* — Myers Wolin, LLC

(57) ABSTRACT

A communication method and apparatus at an unlicensed band. One of the methods includes: an eNB transmits request information respectively to a small cell and UE connected to the eNB, requesting the small cell and the UE to measure a candidate channel on the unlicensed band; the eNB negotiates with the small cell for operational parameters of the small cell according to measurement results reported by the small cell and UE; and the eNB transmits the operational parameters of the small cell negotiated by the eNB with the small cell to the UE, so that the UE accesses to the small cell according to the operational parameters of the small cell and performs data transmission, transmitting data on the unlicensed band, the small cell may select a working channel having minimum interference on other neighboring systems and subjected to minimum interference from the other neighboring systems at the UE side.

20 Claims, 8 Drawing Sheets

(51) Int. Cl.
*H04W 24/02* (2009.01)
*H04W 72/04* (2009.01)
*H04W 28/20* (2009.01)
*H04W 88/08* (2009.01)

(52) U.S. Cl.
CPC ....... *H04W 72/04* (2013.01); *H04W 72/0426* (2013.01); *H04W 88/08* (2013.01); *Y02D 70/00* (2018.01); *Y02D 70/1262* (2018.01); *Y02D 70/142* (2018.01)

(56) References Cited

U.S. PATENT DOCUMENTS

| | | | |
|---|---|---|---|
| 2013/0035125 A1 | 2/2013 | Lee et al. | |
| 2014/0120975 A1 | 5/2014 | Liu et al. | |
| 2015/0049709 A1* | 2/2015 | Damnjanovic | H04L 5/0055 370/329 |
| 2015/0312805 A1* | 10/2015 | Cui | H04W 80/04 370/331 |
| 2015/0373554 A1* | 12/2015 | Freda | H04W 16/14 455/450 |
| 2016/0295614 A1* | 10/2016 | Lee | H04W 48/08 |
| 2017/0195901 A1* | 7/2017 | Zhou | H04W 24/02 |

FOREIGN PATENT DOCUMENTS

| | | |
|---|---|---|
| CN | 103503499 A | 1/2014 |
| WO | 2012/026857 A1 | 3/2012 |
| WO | 2013/131250 A1 | 9/2013 |
| WO | 2013/179095 A1 | 12/2013 |
| WO | 2014/089069 A1 | 6/2014 |
| WO | 2014/111772 A1 | 7/2014 |
| WO | 2014/111772 A4 | 7/2014 |

OTHER PUBLICATIONS

Extended European search report with supplementary European search report and the European search opinion issued by the European Patent Office for corresponding European Patent Application No. 149024051, dated Mar. 29, 2018.
Huawei et al.: "TP for WLAN ANDSF interworking for solution3", Agenda Item: 5.1, 3GPP TSG-RAN WG2 Meeting 184, R2-134265, San Francisco, USA, Nov. 11-15, 2013.
Written Opinion of the International Searching Authority issued for corresponding International Patent Application No. PCT/CN20141087200, dated Jun. 12, 2015, with an English translation.
International Search Report issued for corresponding International Patent Application No. PCT/CN2014/087200, dated Jun. 12, 2015, with an English translation.

* cited by examiner

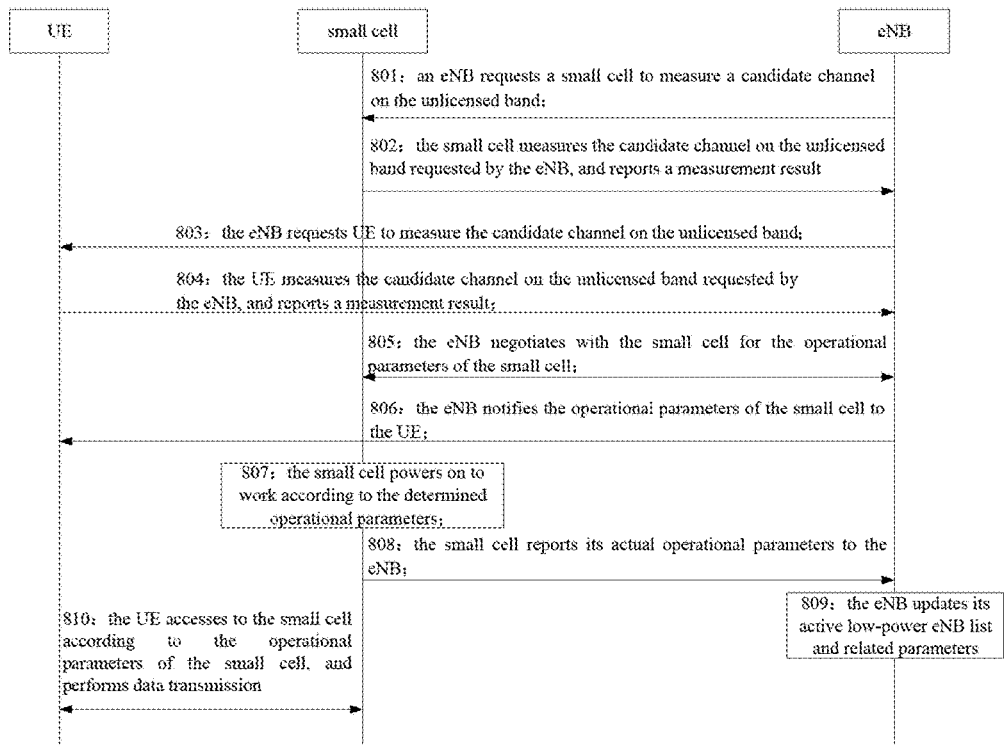

COMMUNICATION METHOD AND APPARATUS AT AN UNLICENSED BAND AND SYSTEM

CROSS REFERENCE TO RELATED APPLICATIONS

This application is a continuation application of International Application PCT/CN2014/087200 filed on Sep. 23, 2014, the entire contents of which are incorporated herein by reference.

FIELD

This disclosure relates to the field of communications, and in particular to a communication method and apparatus at an unlicensed band and a system.

BACKGROUND

In recent years, wireless communication technologies have developed rapidly, and 3GPP (the 3rd generation partnership project) standardization has developed to Rel. 12 (Release 12), key technologies of which covering wide configuration of small cells, carrier aggregation, and 3D (three dimensional) multi-antenna technologies (MIMO, multiple-input multiple-output), etc. Even though it has made a breakthrough in many transmission technologies, considering rapid development of mobile traffics at present and in the future and variety of terminal forms and enormousness of terminal numbers, capacities of LTE (long-term evolution) systems based on licensed bands will still be insufficient at present and in the foreseeable future.

On the one hand, the licensed bands are obtained by the operators through bids at the auction from telecommunications markets, which are high in costs. Hence, all levels of participants in the communication industry will guarantee the full use of these licensed bands by making standard protocols. With the development of technologies in these years, a tradeoff between the cost and effect has been reached in the communication technologies based on licensed bands. And on the other hand, there exist large quantities of unlicensed bands out of the licensed bands delimited by the ITU (International Telecommunication Union), which may be arbitrarily used while satisfying conditions of policies. For example, at a band of 2.6 GHz, which will possibly be 5.0 GHz in the future, there exist a large amount of WiFi (wireless fidelity) applications at the band of 2.6 GHz currently, which may be deployed by operators, and may also be deployed by vendors in markets. Considering that the large amount of unlicensed bands are vacant, participants in the LTE industry start to consider how to introduce the LTE technology into these bands.

It is shown by studies that at these unlicensed bands, the use of the LTE technology will bring a larger system capacity than the use of the WiFi technology, this is because that an LTE system possesses more flexible physical layer transmission technology and MAC (media access control) layer physical resource allocation technology, as well as more advanced QoS (quality of service) administration, etc. Based on these conclusions, consideration of how to use the LTE technology at these unlicensed bands has been started in many studies. A key issue at present is that if the LTE technology is used, interference on the existing WiFi or other systems occupying these unlicensed bands must be strictly controlled.

The interference control technology adopts simple LBT (listen before talk) mechanism in the WiFi system, that is, an access terminal (a station, STD) monitors whether there exist other link data in a link before it prepares for transmitting data. If yes, it monitors again after waiting for a period of time. If no, it will transmit data after a period of time of delay. However, there is no strategy dealing with interference on other access points (APs, which have already occupied the channel) brought about by a wireless AP in transmitting data.

A function of selecting a channel by an AP is added into a protocol in a revised version of the WiFi standard IEEE802.11, that is, when it is detected that a channel is used by another AP, the AP selects another channel to monitor. If the LTE also adopts the similar LBT mechanism in the WiFi in using these unlicensed bands, it will appear that measurement of interference is inaccurate.

Generally speaking, when resources at unlicensed bands are used, a scenario of heterogeneous deployment where a macro cell and small cells coexist is employed, wherein, in the macro cell, a macro eNB is responsible for coverage of UEs, and in the small cells, low power eNBs are responsible for data offloading of UEs. Typical small cells include micro cells, pico cells, femto cells, and remote radio heads (RRHs). In comparison with the low power eNBs of the small cells, the transmission power of the eNB of the macro cell is relatively large.

Two examples are given below to explain the defect of the use of the general LBT mechanism in an LTE network. As shown in FIG. 1, terminal UE is within a coverage range of a WiFi AP, while it is also within a coverage range of a small cell in preparation for using an unlicensed band, and both the WiFi AP and the small cell are at sides of the UE. It is obvious that as the small cell is not within the coverage range of the WiFi, if the LBT mechanism is adopted, it is very possible that the small cell selects a channel identical to that selected by the WiFi AP. However, as the UE is within the coverage range of the WiFi AP, it will result in that the UE cannot correctly receive data from the small cell, since interference will be brought about by use of identical channels by the WiFi AP and the small cell. Likewise, as shown in FIG. 2, the small cell is located between the UE and the WiFi AP, and at this moment, the UE is out of the coverage range of the WiFi AP. If the LBT mechanism is adopted, the UE may use a channel identical to that used by the WiFi AP for transmitting and receiving data. However, as the small cell is very close to the WiFi AP, it will result in that the small cell cannot receive data from the UE correctly, and at the same time, interference will be brought about to the WiFi AP when the small cell transmits data in the channel.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It is shown by the above two examples that if the simple LBT mechanism is used, the use of the LTE technology on the unlicensed bands necessarily bring about severe interference. Hence, there is a need to design a new interference avoidance mechanism to adapt to different cell configuration scenarios.

Embodiments of this disclosure provide a communication method and apparatus at an unlicensed band and a system, so as to avoid interference on other systems when the LTE technology is used on the unlicensed bands.

According to a first aspect of the embodiments of this disclosure, there is provided a communication method at an unlicensed band, wherein the method includes: transmitting request information by an eNB respectively to a small cell and UE connected to the eNB, requesting the small cell and the UE to measure a candidate channel on the unlicensed band; negotiating by the eNB with the small cell for operational parameters of the small cell according to measurement results reported by the small cell and the UE; and transmitting by the eNB the operational parameters of the small cell negotiated by the eNB with the small cell to the UE, so that the UE accesses to the small cell according to the operational parameters of the small cell and performs data transmission.

According to a second aspect of the embodiments of this disclosure, there is provided a communication method at an unlicensed band, wherein the method includes: receiving, by a small cell connected to an eNB, request information requesting to measure a candidate channel on the unlicensed band transmitted by the eNB; measuring, by the small cell, the candidate channel on the unlicensed band requested by the eNB according to the request information, and reporting by the small cell a measurement result to the eNB; and negotiating by the small cell with the eNB for operational parameters of the small cell, so that the small cell powers on to work according to the negotiated operational parameters.

According to a third aspect of the embodiments of this disclosure, there is provided a communication method at an unlicensed band, wherein the method includes: receiving, by UE connected to an eNB, request information requesting to measure a candidate channel on the unlicensed band transmitted by the eNB; measuring, by the UE, the candidate channel on the unlicensed band requested by the eNB according to the request information, and reporting by the UE a measurement result to the eNB; and accessing to a small cell by the UE according to operational parameters of the small cell notified by the eNB, and performing data transmission by the UE.

According to a fourth aspect of the embodiments of this disclosure, there is provided a communication apparatus at an unlicensed band, applicable to an eNB, wherein the apparatus includes: a requesting unit configured to transmit request information respectively to a small cell and UE connected to the eNB, requesting the small cell and the UE to measure a candidate channel on the unlicensed band; a negotiating unit configured to negotiate with the small cell for operational parameters of the small cell according to measurement results reported by the small cell and the UE; and a transmitting unit configured to transmit the operational parameters of the small cell negotiated by the negotiating unit with the small cell to the UE, so that the UE accesses to the small cell according to the operational parameters of the small cell and performs data transmission.

According to a fifth aspect of the embodiments of this disclosure, there is provided a communication apparatus at an unlicensed band, applicable to a small cell connected to an eNB, wherein the apparatus includes: a receiving unit configured to receive request information requesting to measure a candidate channel on the unlicensed band transmitted by the eNB; a measuring unit configured to measure the candidate channel on the unlicensed band requested by the eNB according to the request information, and report a measurement result to the eNB; and a negotiating unit configured to negotiate with the eNB for operational parameters of the small cell, so that the small cell powers on to work according to the negotiated operational parameters.

According to a sixth aspect of the embodiments of this disclosure, there is provided a communication apparatus at an unlicensed band, applicable to UE connected to an eNB, wherein the apparatus includes: a receiving unit configured to receive request information requesting to measure a candidate channel on the unlicensed band transmitted by the eNB; a measuring unit configured to measure the candidate channel on the unlicensed band requested by the eNB according to the request information, and report a measurement result to the eNB; and a processing unit configured to access to a small cell according to operational parameters of the small cell notified by the eNB, and perform data transmission.

According to a seven aspect of the embodiments of this disclosure, there is provided an eNB, including the communication apparatus at an unlicensed band as described in the fourth aspect.

According to an eighth aspect of the embodiments of this disclosure, there is provided a small cell, including the communication apparatus at an unlicensed band as described in the fifth aspect.

According to a ninth aspect of the embodiments of this disclosure, there is provided UE, including the communication apparatus at an unlicensed band as described in the sixth aspect.

According to a ten aspect of the embodiments of this disclosure, there is provided a communication system, including the eNB as described in the seventh aspect, the small cell as described in the eighth aspect, and the UE as described in the ninth aspect.

According to another aspect of the embodiments of this disclosure, there is provided a computer readable program code, which, when executed in an eNB, will cause a computer unit to carry out the communication method at an unlicensed band as described in the first aspect in the eNB.

According to still another aspect of the embodiments of this disclosure, there is provided a computer readable medium, including a computer readable program code, which will cause a computer unit to carry out the communication method at an unlicensed band as described in the first aspect in an eNB.

According to still another aspect of the embodiments of this disclosure, there is provided a computer readable program code, which, when executed in a small cell, will cause a computer unit to carry out the communication method at an unlicensed band as described in the second aspect in the small cell.

According to still another aspect of the embodiments of this disclosure, there is provided a computer readable medium, including a computer readable program code, which will cause a computer unit to carry out the communication method at an unlicensed band as described in the second aspect in the small cell.

According to still another aspect of the embodiments of this disclosure, there is provided a computer readable program code, which, when executed in UE, will cause a computer unit to carry out the communication method at an unlicensed band as described in the third aspect in the UE.

According to still another aspect of the embodiments of this disclosure, there is provided a computer readable medium, including a computer readable program code, which will cause a computer unit to carry out the communication method at an unlicensed band as described in the third aspect in UE.

An advantage of the embodiments of this disclosure exists in that with the embodiments of this disclosure, in transmitting data on the unlicensed band, the small cell may select a working channel having minimum interference on other neighboring systems and subjected to minimum interference from the other neighboring systems at the UE side.

With reference to the following description and drawings, the particular embodiments of this disclosure are disclosed in detail, and the principles of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the exemplary embodiments of this disclosure, and are used for setting forth the principles of this disclosure together with the description. It is clear and understood that the accompanying drawings in the following description are some embodiments of this disclosure, and for those of ordinary skills in the art, other accompanying drawings may be obtained according to these accompanying drawings without making an inventive effort. In the drawings:

FIG. 7 is a flowchart of the communication method at an unlicensed band at a UE side of an embodiment;

FIG. 8 is a flowchart of information exchange between an eNB, a small cell and UE;

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings. These implementations are illustrative only, and are not intended to limit this disclosure.

Figure 1:
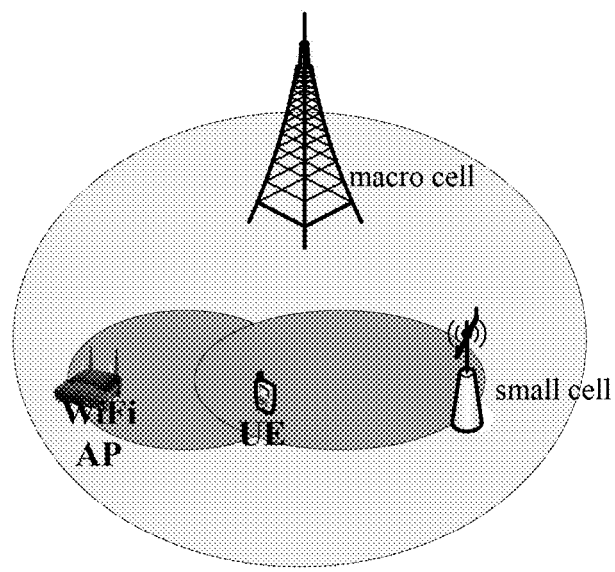
FIG. 1 is a schematic diagram of a scenario of a difference between an interference level of a small cell and an interference level of UE.
Figure 2:
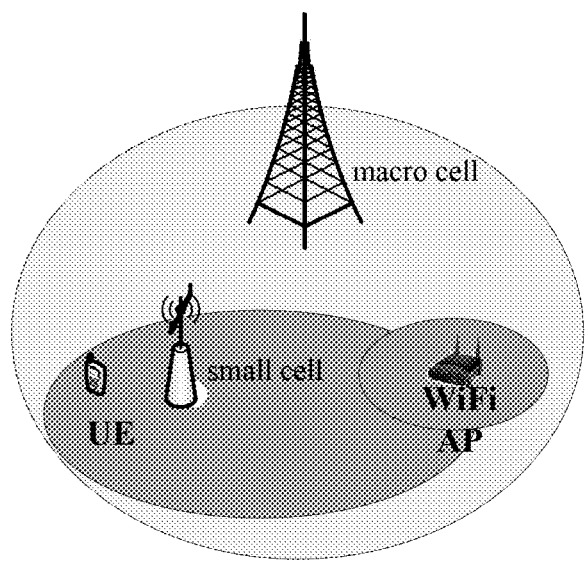
FIG. 2 is another schematic diagram of a scenario of a difference between an interference level of a small cell and an interference level of UE.
Figure 3:
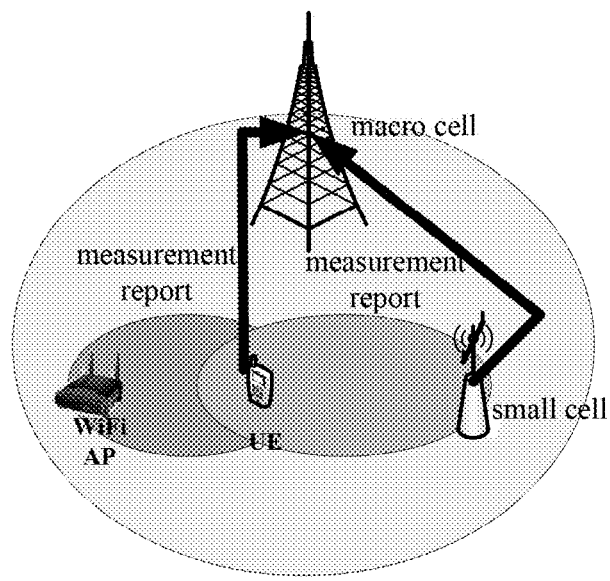
FIG. 3 is a schematic diagram of reporting measurement reports by a small cell and UE.
Figure 4:
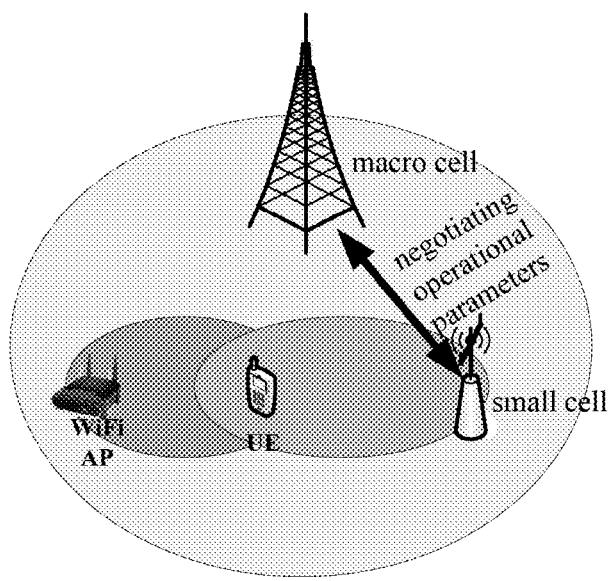
FIG. 4 is a schematic diagram of negotiating operational parameters of a small cell by a macro cell and the small cell.

Considering that in an LTE system, a small cell is usually in a coverage range of a macro cell, as shown in FIGS. 1 and 2, the embodiments of this disclosure achieve a goal of interference coordination and avoidance with the help of a macro eNB. As shown in FIGS. 3 and 4, the embodiments of this disclosure achieve this goal by using a mechanism of joint feedback by UE and a small cell and coordination of a macro cell and the small cell. As shown in FIG. 3, the UE and the small cell measure and feed back a candidate channel at an unlicensed band according to instructions of the macro cell, and the macro cell collects measurement results from the UE and the small cell. Thereafter, the macro cell and the small cell negotiate operational parameters (on parameters) of the small cell, as shown in FIG. 4. The operational parameters of the small cell include such information as a small cell ID, a working channel index, and a working bandwidth, etc.

The embodiments of this disclosure shall be described below in detail with reference to the accompanying drawings and particular implementations.

Embodiment 1

Figure 5:
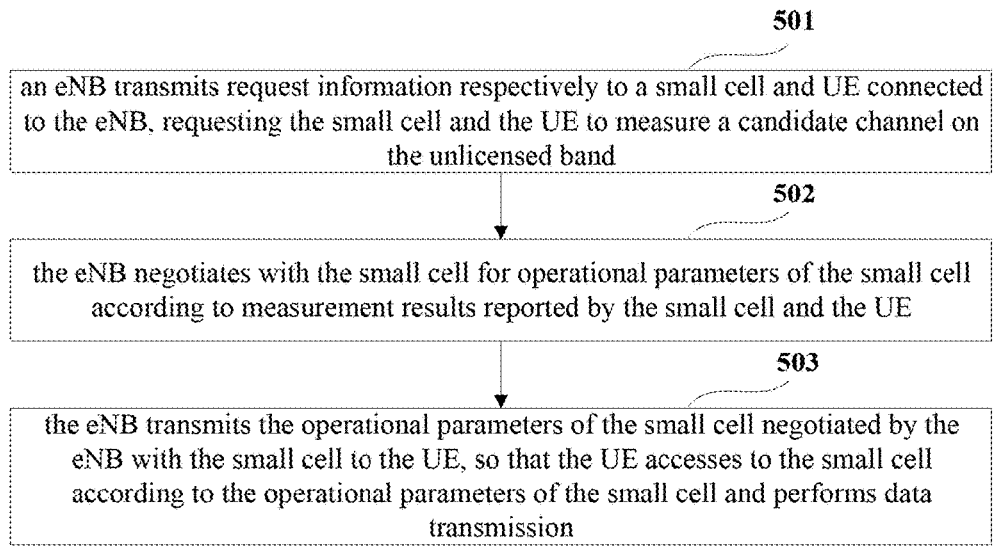
FIG. 5 is a flowchart of the communication method at an unlicensed band at an eNB side of an embodiment.

An embodiment of this disclosure provides a communication method at an unlicensed band. FIG. 5 is a flowchart of the method. Referring to FIG. 5, the method includes:

step 501: an eNB transmits request information respectively to a small cell and UE connected to the eNB, requesting the small cell and the UE to measure a candidate channel on the unlicensed band;

step 502: the eNB negotiates with the small cell for operational parameters of the small cell according to measurement results reported by the small cell and the UE; and step 503: the eNB transmits the operational parameters of the small cell negotiated by the eNB with the small cell to the UE, so that the UE accesses to the small cell according to the operational parameters of the small cell and performs data transmission.

In step 501, the eNB may transmit the above request information to the small cell via an X2 interface between the eNB and the small cell, and transmit the above request information to the UE via an air interface between the eNB and the UE, such as low layer signaling (such as a physical downlink control channel (PDCCH)), and high layer signaling (such as radio resource control (RRC) signaling), etc.

In an implementation of step 501, the unlicensed band and the candidate channel on the unlicensed band may be designated by the above eNB, such as the unlicensed band and the candidate channel on the unlicensed band needing to be measured are designated via the above request information or other information. Alternatively, the eNB may further simultaneously designate a channel bandwidth needing to be measured.

In another implementation of step 501, the unlicensed band and the candidate channel on the unlicensed band may be indicated by a pre-defined list, that is, the unlicensed band and the candidate channel on the unlicensed band needing to be measured are indicated via the pre-defined list. Alternatively, the list may further indicate a channel bandwidth needing to be measured. In this implementation, if the eNB requests the small cell connected to the eNB to measure the candidate channel on the unlicensed band, in this implementation, the pre-defined list is a list pre-defined by the eNB and the small cell; and if the eNB requests the UE connected to the eNB to measure the candidate channel on the unlicensed band, in this implementation, the pre-defined list is a list pre-defined by the eNB and the UE.

In a further implementation of step 501, the unlicensed band and the candidate channel on the unlicensed band may be indicated by an updating indication of the eNB for a pre-defined list. In this implementation, a meaning of the pre-defined list is identical to that of the pre-defined list of the previous implementation. What differs from the previous implementation is that in this implementation, the eNB will issue the updating indication for the pre-defined list via the above request information or other information, that is, for the unlicensed band and the candidate channel on the unlicensed band needing to be measured indicated via the list, the eNB indicates which shall be updated by the updating indication. Thus, a small cell or UE receiving the updating indication may determine the unlicensed band and the candidate channel on the unlicensed band needing to be measured according to the list pre-defined by the two parties and the updating indication. Alternatively, the updating indication may further contain a channel bandwidth needing to be measured.

In step 502, the eNB may negotiate with the small cell for the operational parameters of the small cell via an X2 interface between the eNB and the small cell. The operational parameters here are, for example, a working band index, a working channel index, and/or a working bandwidth, etc., of the small cell. Thus, the small cell may power on to work according to the determined operational parameters.

In an implementation of step 502, the eNB may determine an available candidate operational parameter range of the small cell according to the measurement results reported by the small cell and the UE and notify the range to the small cell. Thus, the small cell may determine its actual operational parameters accordingly and report them to the eNB, and the small cell may slightly adjust the operational parameters before power-on, so as to ensure that interference brought by it to other adjacent systems is minimum.

In step 503, the eNB may transmit the operational parameters of the small cell, such as a cell index, a working band index, a working channel index, and a working bandwidth of the small cell, to the UE via an air interface between the eNB and the UE. Thus, the UE may access to the small cell according to the operational parameters of the small cell notified by the eNB and perform data transmission. And as interference of the operational parameters on other adjacent systems is relatively small, interference of other adjacent systems on the UE is reduced.

In this embodiment, the small cell may operate according to the operational parameters determined through negotiation, or may adjust its operational parameters within an adjustable range after a period of time, and the small cell may report its actual operational parameters to the eNB. Hence, in this embodiment, the eNB may further receive the above actual operational parameters reported by the small cell, and update a pre-stored active low-power eNB list and related parameters according to the actual operational parameters. In this embodiment, the active low-power eNB list is pre-stored by the eNB and records states of small cells connected to it and related operational parameters. Once a state or an operational parameter of a small cell changes, the eNB may update the active low-power eNB list and related parameters according to the change.

The communication method at an unlicensed band is described above in detail by the description of processing at the eNB side. And processing at the small cell side and UE side shall be described in the following embodiments.

With the method of this embodiment, the eNB indicates the small cell and the user equipment (UE) to perform measurement on a candidate channel on an unlicensed band, after obtaining the measurement results fed back by the small cell and the UE, the eNB negotiates with the small cell for the operational parameters, and the small cell powers on to work according to the negotiated operational parameter, and the eNB notifies the operational parameters of the small cell to the UE. Thereafter, the UE may access to the small cell operating on the unlicensed band, and perform data transmission. With such a design, the small cell may select a working channel on the unlicensed band to transmit data, the working channel having minimum interference on other neighboring systems and subjected to minimum interference from the other neighboring systems at the UE side.

Embodiment 2

Figure 6:
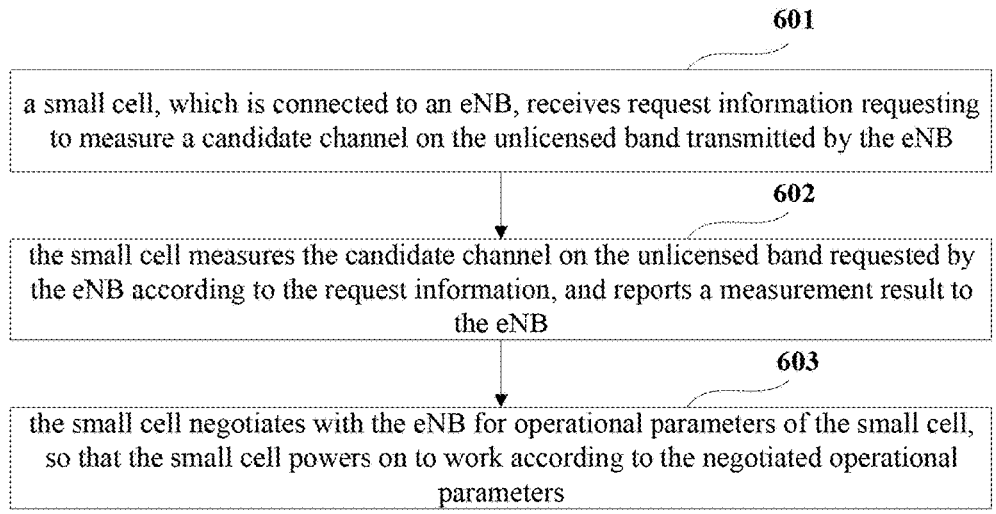
FIG. 6 is a flowchart of the communication method at an unlicensed band at a small cell side of an embodiment.

An embodiment of this disclosure further provides a communication method at an unlicensed band. FIG. 6 is a flowchart of the method. Referring to FIG. 6, the method includes:

step 601: a small cell, which is connected to an eNB, receives request information requesting to measure a candidate channel on the unlicensed band transmitted by the eNB;

step 602: the small cell measures the candidate channel on the unlicensed band requested by the eNB according to the request information, and reports a measurement result to the eNB; and step 603: the small cell negotiates with the eNB for operational parameters of the small cell, so that the small cell powers on to work according to the negotiated operational parameters.

In step 601, as described in Embodiment 1, in an implementation, the unlicensed band and the candidate channel on the unlicensed band may be designated by the eNB; alternatively, the eNB may further designate a channel width needing to be measured. In another implementation, the unlicensed band and the candidate channel on the unlicensed band may be indicated by a list pre-defined by the eNB and the small cell; alternatively, the list may further indicate a channel width needing to be measured. In a further implementation, the unlicensed band and the candidate channel on the unlicensed band may be indicated by an updating indication of the eNB for the list pre-defined by the eNB and the small cell. Alternatively, the updating indication may further contain a channel bandwidth needing to be measured. And in step 601, corresponding to step 501 in Embodiment 1, the above request information may be exchanged via an X2 interface between the small cell and the eNB.

In step 602, the measurement result may be an energy intensity on the candidate channel, and may also be other indices, which are not limited in this embodiment. In this embodiment, if the measurement result is an energy intensity, the small cell may feed back measured energy intensities on candidate channels to the eNB. Likewise, the feedback of the small cell may be exchanged via an X2 interface between the eNB and the small cell, that is, the small cell may report the measurement result to the eNB via an X2 interface between the eNB and the small cell.

In step 603, corresponding to step 502 in Embodiment 1, the small cell may negotiate with the eNB via an X2 interface for operational parameters of the small cell, such as a working band index, a working channel index, and/or a working bandwidth of the small cell, and power on to work according to the negotiated operational parameters.

In this embodiment, as described in Embodiment 1, the small cell may also adjust its operational parameters, and in an implementation, no matter whether the small cell adjusts its operational parameters, the small cell reports its actual operational parameters to the eNB; and in another implementation, if the operational parameters of the small cell do not change, the small cell does not report its actual operational parameters to the eNB, and if the operational parameters of the small cell change, the small cell reports its actual operational parameters to the eNB. Thus, the eNB may update its active low-power eNB list and related parameters according to the information reported by the small cell, which is as described above, and shall not be described herein any further.

With the method of this embodiment, the small cell measures the candidate channel on the unlicensed band according to the request from the eNB and reports the measurement result to the eNB, and after negotiating with the eNB for the operational parameters of the small cell, powers on to work according to the negotiated operational parameters. Thus, the small cell may select a working channel on the unlicensed band having minimum interference on other neighboring systems to transmit data.

Embodiment 3

An embodiment of this disclosure further provides a communication method at an unlicensed band. FIG. 7 is a flowchart of the method. Referring to FIG. 7, the method includes:

step 701: UE, which is connected to an eNB, receives request information requesting to measure a candidate channel on the unlicensed band transmitted by the eNB;

step 702: the UE measures the candidate channel on the unlicensed band requested by the eNB according to the request information, and reports a measurement result to the eNB; and step 703: the UE accesses to a small cell according to operational parameters of the small cell notified by the eNB, and performs data transmission.

In step 701, as described in Embodiment 1, in an implementation, the unlicensed band and the candidate channel on the unlicensed band may be designated by the eNB; alternatively, the eNB may further designate a channel width needing to be measured. In another implementation, the unlicensed band and the candidate channel on the unlicensed band may be indicated by a list pre-defined by the eNB and the UE; alternatively, the list may further indicate a channel width needing to be measured. In a further implementation, the unlicensed band and the candidate channel on the unlicensed band may be indicated by an updating indication of the eNB for the list pre-defined by the eNB and the UE. Alternatively, the updating indication may further contain a channel bandwidth needing to be measured. And in step 701, corresponding to step 501 in Embodiment 1, the above request information may be exchanged via an air interface between the UE and the eNB, such as low layer signaling (such as PDCCH signaling), and high layer signaling (such as RRC signaling), etc.

In step 702, similar to Embodiment 2, the measurement result may be an energy intensity on the candidate channel, and may also be other indices, which are not limited in this embodiment. In this embodiment, if the measurement result is an energy intensity, the small cell may feed back measured energy intensities on candidate channels to the eNB. Likewise, the feedback of the UE may be exchanged via an air interface between the eNB and the UE, such as low layer signaling (such as physical uplink control channel (PUCCH) signaling), and high layer signaling (such as RRC signaling), etc., that is, the UE may report the measurement result to the eNB via an air interface between the eNB and the UE.

In step 703, as described in Embodiment 1, the eNB may notify the UE of the operational parameters of the small cell, such as a cell index, a working band index, a working channel index, and/or a working bandwidth, etc., via an air interface between the eNB and the UE. Thus, the UE may access to the small cell according to the operational parameters of the small cell notified by the eNB and perform data transmission at a new unlicensed band.

With the method of this embodiment, the UE measures the candidate channel on the unlicensed band according to the request from the eNB and reports the measurement result to the eNB, and accesses to the small cell operating on the unlicensed band according to the operational parameters of the small cell notified by the eNB and performs data transmission. Hence, it may be ensured that the interference of other neighboring systems on the working channel of the UE is minimum.

For the methods of embodiments 1-3 to be more clear and easy to be understood, the methods of embodiments 1-3 shall be described below in detail with reference to a process of information exchange between the eNB, the small cell and the UE shown in FIG. 8. As shown in FIG. 8, the process of exchange includes:

step 801: an eNB requests a small cell to measure a candidate channel on the unlicensed band;

step 802: the small cell measures the candidate channel on the unlicensed band requested by the eNB, and reports a measurement result;

step 803: the eNB requests UE to measure the candidate channel on the unlicensed band;

step 804: the UE measures the candidate channel on the unlicensed band requested by the eNB, and reports a measurement result;

step 805: the eNB negotiates with the small cell for the operational parameters of the small cell;

step 806: the eNB notifies the operational parameters of the small cell to the UE;

step 807: the small cell powers on to work according to the determined operational parameters;

step 808: the small cell reports its actual operational parameters to the eNB;

step 809: the eNB updates its active low-power eNB list and related parameters; and step 810: the UE accesses to the small cell according to the operational parameters of the small cell, and performs data transmission.

In this embodiment, particular implementations of the steps have been described in embodiments 1-3, and shall not be described herein any further. It should be noted that an order of executing the above steps is not limited in this embodiment, and may be adjusted in particular implementation. For example, steps 801-802 and steps 803-804 may be executed in parallel, and may be executed in another order, such as steps 803-804 are executed first, and then steps 801-802 are executed. For another example, step 806 and steps 807-809 may be executed in parallel, and may be executed in another order, such as steps 807-809 are executed first, and then step 806 is executed.

With the methods in embodiments 1-3, interference due to use of the LTE technology at unlicensed bands may be avoided.

Embodiment 4

An embodiment of this disclosure further provides a communication apparatus at an unlicensed band applicable to an eNB. As principles of the apparatus for solving problems are similar to that of the method in Embodiment 1, the implementation of the method in Embodiment 1 may be referred to for implementation of the apparatus, with identical contents being not going to be described herein any further.

Figure 9:
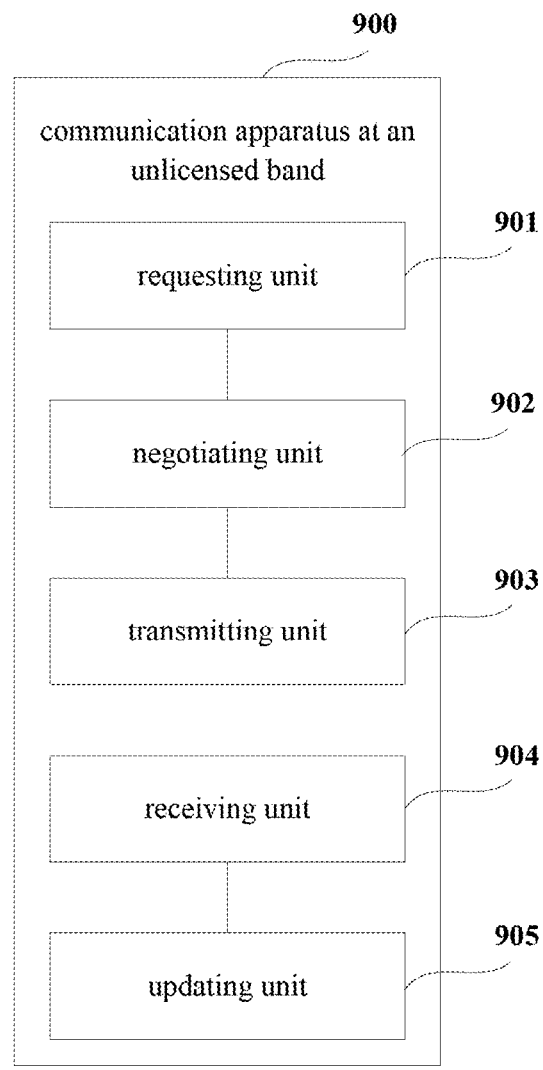
FIG. 9 is a schematic diagram of a structure of the communication apparatus at an unlicensed band applicable to an eNB of an embodiment.

FIG. 9 is a schematic diagram of a structure of the apparatus. As shown in FIG. 9, the apparatus 900 includes: a requesting unit 901, a negotiating unit 902 and a transmitting unit 903; wherein, the requesting unit 901 transmits request information respectively to a small cell and UE connected to the eNB, requesting the small cell and the UE to measure a candidate channel on the unlicensed band;

in this embodiment the unlicensed band and the candidate channel on the unlicensed band may be designated by the eNB; alternatively, the eNB may further designate a channel bandwidth needing to be measured;

in this embodiment, the unlicensed band and the candidate channel on the unlicensed band may be indicated by a pre-defined list; alternatively, the list may further indicate a channel bandwidth needing to be measured;

in this embodiment, the unlicensed band and the candidate channel on the unlicensed band may be indicated by an updating indication of the eNB for a pre-defined list; alternatively, the updating indication may further contain a channel bandwidth needing to be measured;

in this embodiment, the requesting unit 901 may transmit the request information to the small cell via an X2 interface between the eNB and the small cell, and may transmit the request information to the UE via an air interface between the eNB and the UE;

the negotiating unit 902 negotiates with the small cell for operational parameters of the small cell according to measurement results reported by the small cell and the UE;

in this embodiment, the negotiating unit 902 may negotiate with the small cell for the operational parameters of the small cell via an X2 interface between the eNB and the small cell, and the operational parameters of the small cell may include: a working band index, a working channel index, and a working bandwidth, etc.;

the transmitting unit 903 transmits the operational parameters of the small cell negotiated by the negotiating unit 902 with the small cell to the UE, so that the UE accesses to the small cell according to the operational parameters of the small cell and performs data transmission;

in this embodiment, the transmitting unit 903 may transmit the operational parameters of the small cell, such as a cell index, a working band index, a working channel index, and a working bandwidth, to the UE, via an air interface between the eNB and the UE.

In this embodiment, the apparatus may further include: a receiving unit 904 and an updating unit 905; wherein, the receiving unit 904 receives actual operational parameters reported by the small cell, and the updating unit 905 updates an active low-power eNB list and related parameters pre-stored by the eNB according to the actual operational parameters.

With the apparatus of this embodiment, the eNB indicates the small cell and the UE to perform measurement on a candidate channel on an unlicensed band, after obtaining the measurement results fed back by the small cell and the UE, the eNB negotiates with the small cell for the operational parameters, and the small cell powers on to work according to the negotiated operational parameters, and the eNB notifies the operational parameters of the small cell to the UE. Thereafter, the UE may access to the small cell operating on the unlicensed band, and perform data transmission. With such a design, the small cell may select a working channel on the unlicensed band to transmit data, the working channel having minimum interference on other neighboring systems and subjected to minimum interference from the other neighboring systems at the UE side.

Embodiment 5

An embodiment of this disclosure further provides a communication apparatus at an unlicensed band applicable to a small cell connected to an eNB. As principles of the apparatus for solving problems are similar to that of the method in Embodiment 2, the implementation of the method in Embodiment 2 may be referred to for implementation of the apparatus, with identical contents being not going to be described herein any further.

Figure 10:
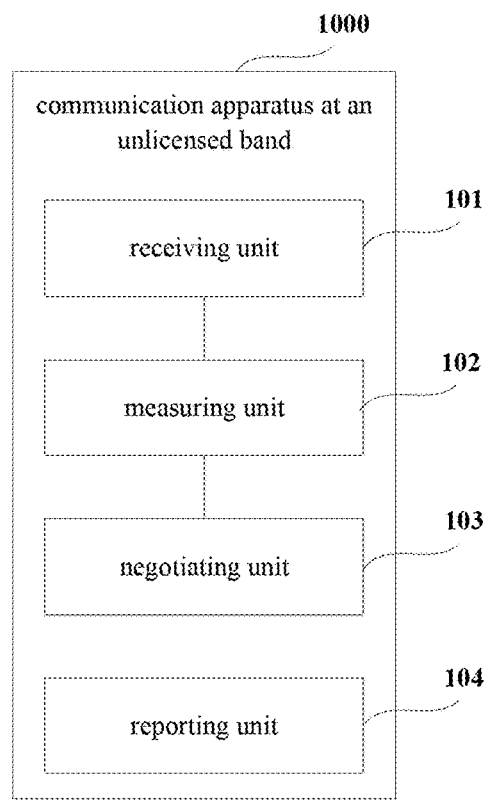
FIG. 10 is a schematic diagram of a structure of the communication apparatus at an unlicensed band applicable to a small cell of an embodiment.

FIG. 10 is a schematic diagram of a structure of the apparatus. As shown in FIG. 10, the apparatus 1000 includes: a receiving unit 101, a measuring unit 102 and a negotiating unit 103; wherein, the receiving unit 101 receives request information requesting to measure a candidate channel on the unlicensed band transmitted by the eNB;

in this embodiment, Embodiment 2 may be referred to for a method for indicating the unlicensed band and the candidate channel on the unlicensed band; and the receiving unit 101 may receive the above request information via an X2 interface between the eNB and the small cell;

the measuring unit 102 measures the candidate channel on the unlicensed band requested by the eNB according to the request information, and reports a measurement result to the eNB;

in this embodiment, the measurement result may be an energy intensity on the candidate channel, and the measuring unit 102 may report the measurement result to the eNB via an X2 interface between the eNB and the small cell;

the negotiating unit 103 negotiates with the eNB for operational parameters of the small cell, so that the small cell powers on to work according to the negotiated operational parameters;

in this embodiment, the negotiating unit 103 may negotiate with the eNB for the operational parameters of the small cell via an X2 interface between the eNB and the small cell; and the operational parameters here may include a working band index, a working channel index, and/or a working bandwidth.

In this embodiment, the apparatus may further include a reporting unit 104, which is configured to report actual operational parameters of the small cell to the eNB, or when operational parameters of the small cell change, report the actual operational parameters of the small cell to the eNB.

With the apparatus of this embodiment, the small cell measures the candidate channel on the unlicensed band according to the request from the eNB and reports the measurement result to the eNB, and after negotiating with the eNB for the operational parameters of the small cell, powers on to work according to the negotiated operational parameters. Thus, the small cell may select a working channel on the unlicensed band having minimum interference on other neighboring systems to transmit data.

Embodiment 6

An embodiment of this disclosure further provides a communication apparatus at an unlicensed band applicable to UE connected to an eNB. As principles of the apparatus for solving problems are similar to that of the method in Embodiment 3, the implementation of the method in Embodiment 3 may be referred to for implementation of the apparatus, with identical contents being not going to be described herein any further.

Figure 11:
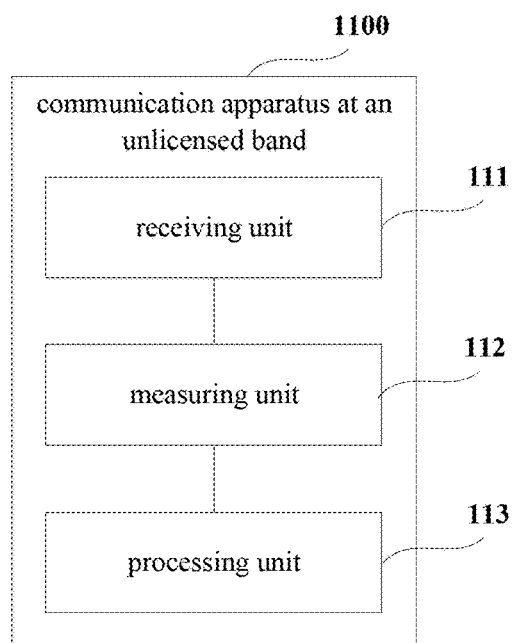
FIG. 11 is a schematic diagram of a structure of the communication apparatus at an unlicensed band applicable to UE of an embodiment.

FIG. 11 is a schematic diagram of a structure of the apparatus. As shown in FIG. 11, the apparatus 1100 includes: a receiving unit 111, a measuring unit 112 and a processing unit 113; wherein, the receiving unit 111 receives request information requesting to measure a candidate channel on the unlicensed band transmitted by the eNB;

in this embodiment, Embodiment 3 may be referred to for a method for indicating the unlicensed band and the candidate channel on the unlicensed band; and the receiving unit 111 may receive the above request information via an air interface between the eNB and the UE, such as low layer signaling (such as PDCCH signaling), and high layer signaling (such as RRC signaling), etc.;

the measuring unit 112 measures the candidate channel on the unlicensed band requested by the eNB according to the request information, and reports a measurement result to the eNB;

in this embodiment, the measurement result may be an energy intensity on the candidate channel, and the measuring unit 112 may report the measurement result to the eNB via an air interface between the eNB and the UE, such as low layer signaling (such as PUCCH signaling), and high layer signaling (such as RRC signaling), etc.;

and the processing unit 113 accesses to a small cell according to operational parameters of the small cell notified by the eNB, and performs data transmission;

in this embodiment, the operational parameters here may include a cell index, a working band index, a working channel index, and/or a working bandwidth.

With the apparatus of this embodiment, the UE measures the candidate channel on the unlicensed band according to the request from the eNB and reports the measurement result to the eNB, and accesses to the small cell operating on the unlicensed band according to the operational parameters of the small cell notified by the eNB and performs data transmission. Hence, it may be ensured that the interference of other neighboring systems on the working channel of the UE is minimum.

Embodiment 7

An embodiment of this disclosure further provides an eNB, including the communication apparatus at an unlicensed band as described in Embodiment 4.

Figure 12:
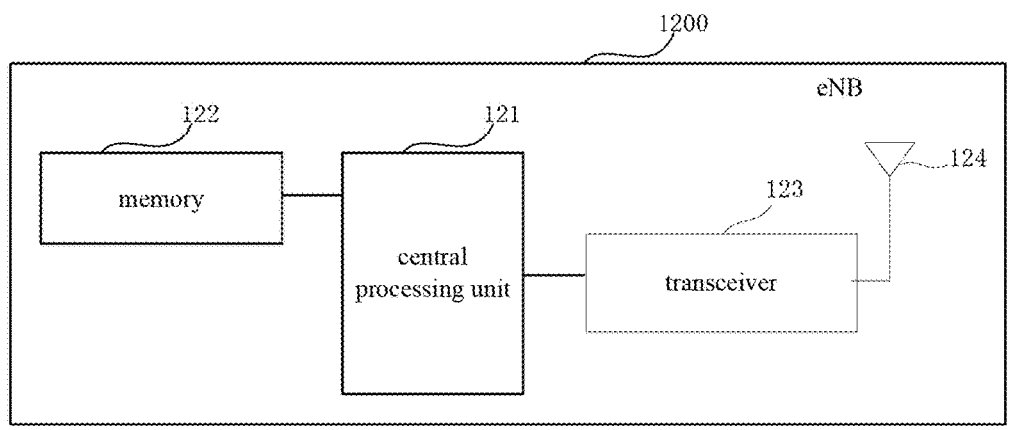
FIG. 12 is a schematic diagram of a structure of an eNB of an embodiment.

FIG. 12 is a schematic diagram of a structure of the eNB of the embodiment of this disclosure. As shown in FIG. 12, the eNB 1200 may include a central processing unit (CPU) 121 and a memory 122, the memory 122 being coupled to the central processing unit 121. In this embodiment, the memory 122 may store various data, and furthermore, it may store a program for information processing, and execute the program under control of the central processing unit 121, so as to receive various information transmitted by the UE, and transmit request information to the UE.

In an implementation, the functions of the communication apparatus at an unlicensed band may be integrated into the central processing unit 121. In this embodiment, the central processing unit 121 may be configured to: transmit request information respectively to a small cell and UE connected to the eNB, requesting the small cell and the UE to measure a candidate channel on the unlicensed band; negotiate with the small cell for operational parameters of the small cell according to measurement results reported by the small cell and the UE; and transmit the operational parameters of the small cell negotiated by the eNB with the small cell to the UE, so that the UE accesses to the small cell according to the operational parameters of the small cell and performs data transmission.

In this embodiment, the unlicensed band and the candidate channel on the unlicensed band may be designated by the eNB; alternatively, the eNB may further designate a channel bandwidth needing to be measured.

In this embodiment, the unlicensed band and the candidate channel on the unlicensed band may be indicated by a pre-defined list; alternatively, the list may further indicate a channel bandwidth needing to be measured.

In this embodiment, the unlicensed band and the candidate channel on the unlicensed band may be indicated by an updating indication of the eNB for a pre-defined list; alternatively, the updating indication may further contain a channel bandwidth needing to be measured.

Alternatively, the central processing unit 121 may further be configured to: transmit the request information to the small cell via an X2 interface between the eNB and the small cell, and transmit the request information to the UE via an air interface between the eNB and the UE.

Alternatively, the central processing unit 121 may further be configured to: negotiate with the small cell for the operational parameters of the small cell via an X2 interface between the eNB and the small cell; wherein the operational parameters of the small cell include: a working band index, a working channel index, and a working bandwidth.

Alternatively, the central processing unit 121 may further be configured to: transmit the operational parameters of the small cell to the UE via an air interface between the eNB and the UE; wherein, the operational parameters of the small cell include: a cell index, a working band index, a working channel index, and a working bandwidth.

Alternatively, the central processing unit 121 may further be configured to: receive actual operational parameters reported by the small cell, and update an active low-power eNB list and related parameters pre-stored by the eNB according to the actual operational parameters.

In another implementation, the communication apparatus at an unlicensed band and the central processing unit 121 may be configured separately. For example, the communication apparatus at an unlicensed band may be configured as a chip connected to the central processing unit 121, with its functions being realized under control of the central processing unit 121.

Furthermore, as shown in FIG. 12, the eNB 1200 may further include a transceiver 123, and an antenna 124, etc.; wherein, functions of these components are similar to those in the prior art, which shall not be described herein any further. It should be noted that the eNB 1200 does not necessarily include all the parts shown in FIG. 12, and furthermore, the eNB 1200 may include parts not shown in FIG. 12, and the prior art may be referred to.

With the eNB of this embodiment, the small cell and the UE are indicated to perform measurement on a candidate channel on an unlicensed band, after obtaining the measurement results fed back by the small cell and the UE, the eNB negotiates with the small cell for the operational parameters, and the small cell powers on to work according to the negotiated operational parameters, and the eNB notifies the operational parameters of the small cell to the UE. Thereafter, the UE may access to the small cell operating on the unlicensed band, and perform data transmission. With such a design, the small cell may select a working channel on the unlicensed band to transmit data, the working channel having minimum interference on other neighboring systems and subjected to minimum interference from the other neighboring systems at the UE side.

Embodiment 8

An embodiment of this disclosure provides a small cell, including the communication apparatus at an unlicensed band as described in Embodiment 5.

Figure 13:
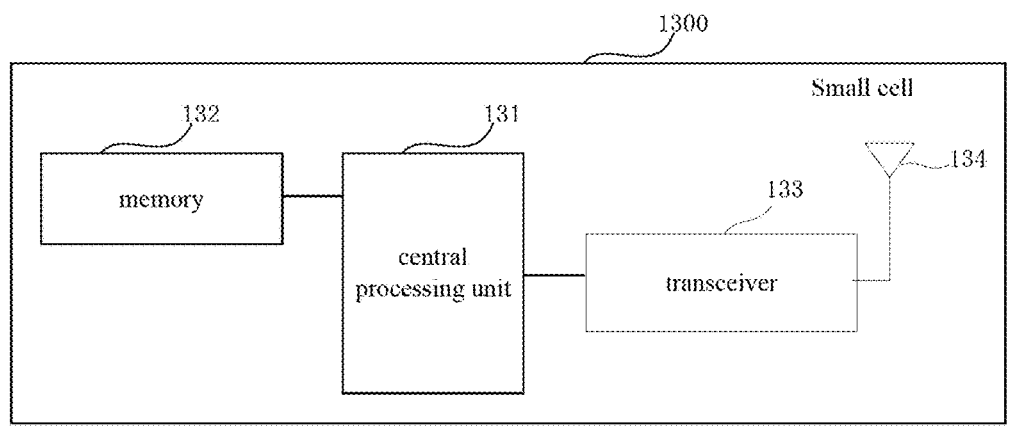
FIG. 13 is a schematic diagram of a structure of a small cell of an embodiment.

FIG. 13 is a schematic diagram of a structure of the small cell of the embodiment of this disclosure. As shown in FIG. 13, the small cell 1300 may include a central processing unit (CPU) 131 and a memory 132, the memory 132 being coupled to the central processing unit 131. In this embodiment, the memory 132 may store various data, and furthermore, it may store a program for information processing, and execute the program under control of the central processing unit 131, so as to receive various information transmitted by the eNB, and transmit information to the eNB.

In an implementation, the functions of the communication apparatus at an unlicensed band may be integrated into the central processing unit 131. In this embodiment, the central processing unit 131 may be configured to: receive request information requesting to measure a candidate channel on the unlicensed band transmitted by the eNB; measure the candidate channel on the unlicensed band requested by the eNB according to the request information, and report a measurement result to the eNB; and negotiate with the eNB for operational parameters of the small cell, so that the small cell powers on to work according to the negotiated operational parameters.

In this embodiment, the measurement result may be an energy intensity on the candidate channel.

Alternatively, the central processing unit 131 may be configured to: report the measurement result to the eNB via an X2 interface between the eNB and the small cell.

Alternatively, the central processing unit 131 may be configured to: report actual operational parameters of the small cell to the eNB, or when operational parameters of the small cell change, report the actual operational parameters of the small cell to the eNB.

In another implementation, the communication apparatus at an unlicensed band and the central processing unit 131 may be configured separately. For example, the communication apparatus at an unlicensed band may be configured as a chip connected to the central processing unit 131, with its functions being realized under control of the central processing unit 131.

Furthermore, as shown in FIG. 13, the eNB 1300 may further include a transceiver 133, and an antenna 134, etc.; wherein, functions of these components are similar to those in the prior art, which shall not be described herein any further. It should be noted that the eNB 1300 does not necessarily include all the parts shown in FIG. 13, and furthermore, the eNB 1300 may include parts not shown in FIG. 13, and the prior art may be referred to.

With the small cell of this embodiment, the small cell may measure the candidate channel on the unlicensed band according to the request from the eNB, report the measurement result to the eNB, negotiate with the eNB for the operational parameters of the small cell, and power on to work according to the negotiated operational parameters. Thus, the small cell may select a working channel on the unlicensed band having minimum interference on other neighboring systems to transmit data.

Embodiment 9

An embodiment of this disclosure provides UE, including the communication apparatus at an unlicensed band as described in Embodiment 6.

Figure 14:
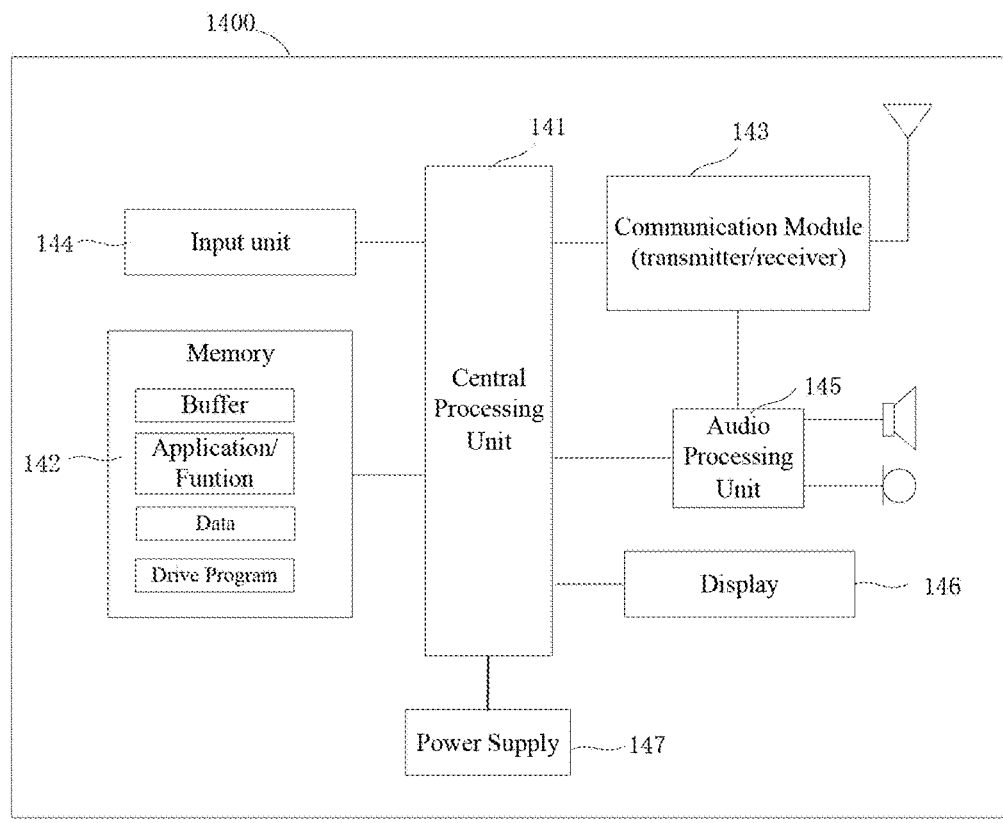
FIG. 14 is a schematic diagram of a structure of UE of an embodiment.

FIG. 14 is a schematic diagram of a structure of the UE 1400 of the embodiment of this disclosure. As shown in FIG. 14, the UE 1400 may include a central processing unit (CPU) 141 and a memory 142, the memory 142 being coupled to the central processing unit 141. It should be noted that this figure is illustrative only, and other types of structures may also be used, so as to supplement or replace this structure and achieve telecommunications function or other functions.

In an implementation, the functions of the communication apparatus at an unlicensed band may be integrated into the central processing unit 141. In this embodiment, the central processing unit 141 may be configured to: receive request information requesting to measure a candidate channel on the unlicensed band transmitted by the eNB; measure the candidate channel on the unlicensed band requested by the eNB according to the request information, and report a measurement result to the eNB; and access to a small cell according to operational parameters of the small cell notified by the eNB, and perform data transmission.

In this embodiment, the measurement result may be an energy intensity on the candidate channel.

Alternatively, the central processing unit 141 may be configured to: report the measurement result to the eNB via an air interface between the eNB and the UE.

In another implementation, the communication apparatus at an unlicensed band and the central processing unit 141 may be configured separately. For example, the communication apparatus at an unlicensed band may be configured as a chip connected to the central processing unit 141, with its functions being realized under control of the central processing unit 141.

Furthermore, as shown in FIG. 14, the UE 1400 may further include a communication module 143, an input unit 144, an audio processing unit 145, a display 146 and a power supply 147. It should be noted that the UE 1400 does not necessarily include all the parts shown in FIG. 14, and furthermore, the UE 1400 may include parts not shown in FIG. 14, and the prior art may be referred to.

As shown in FIG. 14, the central processing unit 141 is sometimes referred to as a controller or control, and may include a microprocessor or other processor devices and/or logic devices. The central processing unit 141 receives input and controls operations of every components of the UE 1400.

In this embodiment, the memory 142 may be, for example, one or more of a buffer memory, a flash memory, a hard drive, a mobile medium, a volatile memory, a nonvolatile memory, or other suitable devices, which may store information on the above pre-defined list, etc., and may further store a program executing related information. And the central processing unit 141 may execute the program stored in the memory 142, so as to realize information storage or processing, etc. Functions of other parts are similar to those of the prior art, which shall not be described herein any further. The parts of the UE 1400 may be realized by specific hardware, firmware, software, or any combination thereof, without departing from the scope of the present disclosure.

With the UE of this embodiment, the UE may measure the candidate channel on the unlicensed band according to the request from the eNB, report the measurement result to the eNB, access to the small cell operating on the unlicensed band according to the operational parameters of the small cell notified by the eNB, and perform data transmission. Hence, it may be ensured that the interference of other neighboring systems on the working channel of the UE is minimum.

Embodiment 10

An embodiment of this disclosure further provides a communication system, including the eNB as described in Embodiment 7, the small cell as described in Embodiment 8 and the UE as described in Embodiment 9.

Figure 15:
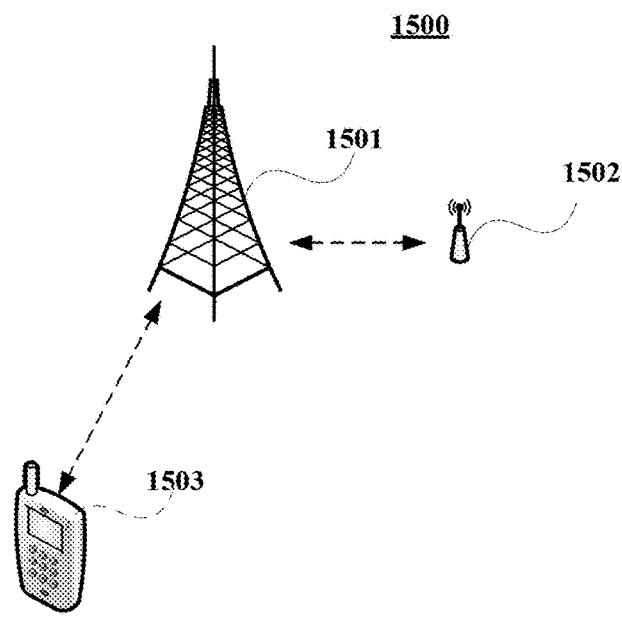
FIG. 15 is a schematic diagram of a structure of a communication system of an embodiment.

FIG. 15 is a schematic diagram of a structure of the communication system of an embodiment. As shown in FIG. 15, the communication system 1500 includes an eNB 1501, a small cell 1502 and UE 1503. In this embodiment, the eNB 1501 may be the eNB 1200 as described in Embodiment 7, the small cell 1502 may be the small cell 1300 as described in Embodiment 8, and the UE 1503 may be the UE 1400 as described in Embodiment 9.

As the eNB 1200, the small cell 1300 the UE 1400 have been described in detail in embodiments 7-9, their contents are incorporated herein, and shall not be described herein any further.

With the system of this embodiment, the eNB indicates the small cell and the UE to perform measurement on a candidate channel on an unlicensed band, after obtaining the measurement results fed back by the small cell and the UE, the eNB negotiates with the small cell for the operational parameters, and the small cell powers on to work according to the negotiated operational parameters, and the eNB notifies the operational parameters of the small cell to the UE. Thereafter, the UE may access to the small cell operating on the unlicensed band, and perform data transmission. With such a design, the small cell may select a working channel on the unlicensed band to transmit data, the working channel having minimum interference on other neighboring systems and subjected to minimum interference from the other neighboring systems at the UE side.

An embodiment of the present disclosure provides a computer readable program code, which, when executed in an information processing apparatus or an eNB, will cause a computer unit to carry out the communication method at an unlicensed band as described in Embodiment 1 in the information processing apparatus or the eNB.

An embodiment of the present disclosure provides a computer readable medium, including a computer readable program code, which will cause a computer unit to carry out the communication method at an unlicensed band as described in Embodiment 1 in an information processing apparatus or an eNB.

An embodiment of the present disclosure provides a computer readable program code, which, when executed in an information processing apparatus or a small cell, will cause a computer unit to carry out the communication method at an unlicensed band as described in Embodiment 2 in the information processing apparatus or the small cell.

An embodiment of the present disclosure provides a computer readable medium, including a computer readable program code, which will cause a computer unit to carry out the communication method at an unlicensed band as described in Embodiment 2 in an information processing apparatus or a small cell.

An embodiment of the present disclosure provides a computer readable program code, which, when executed in an information processing apparatus or UE, will cause a computer unit to carry out the communication method at an unlicensed band as described in Embodiment 3 in the information processing apparatus or the UE.

An embodiment of the present disclosure provides a computer readable medium, including a computer readable program code, which will cause a computer unit to carry out the communication method at an unlicensed band as described in Embodiment 3 in an information processing apparatus or UE.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

What is claimed is:

1. A communication apparatus at an unlicensed band, applicable to an eNB, the apparatus comprising:
   a requesting unit configured to transmit request information respectively to a small cell and UE connected to the eNB, requesting the small cell and the UE to measure a candidate channel on the unlicensed band;

a negotiating unit configured to negotiate with the small cell for operational parameters of the small cell according to measurement results reported by the small cell and the UE; and a transmitting unit configured to transmit the operational parameters of the small cell negotiated by the negotiating unit with the small cell to the UE, so that the UE accesses to the small cell according to the operational parameters of the small cell and performs data transmission.

2. The apparatus according to claim 1, wherein the unlicensed band and the candidate channel on the unlicensed band are designated by the eNB.

3. The apparatus according to claim 2, wherein the eNB further designates a channel bandwidth needing to be measured.

4. The apparatus according to claim 1, wherein the unlicensed band and the candidate channel on the unlicensed band are indicated by a pre-defined list.

5. The apparatus according to claim 4, wherein the list further indicates a channel bandwidth needing to be measured.

6. The apparatus according to claim 1, wherein the unlicensed band and the candidate channel on the unlicensed band are indicated by an updating indication of the eNB for a pre-defined list.

7. The apparatus according to claim 6, wherein the updating indication further includes a channel bandwidth needing to be measured.

8. The apparatus according to claim 1, wherein,
the requesting unit transmits the request information to the small cell via an X2 interface between the eNB and the small cell;
and the requesting unit transmits the request information to the UE via an air interface between the eNB and the UE.

9. The apparatus according to claim 1, wherein the negotiating unit negotiates with the small cell for the operational parameters of the small cell via an X2 interface between the eNB and the small cell.

10. The apparatus according to claim 9, wherein the operational parameters of the small cell include: a working band index, a working channel index, and a working bandwidth.

11. The apparatus according to claim 1, wherein the transmitting unit transmits the operational parameters of the small cell to the UE via an air interface between the eNB and the UE.

12. The apparatus according to claim 11, wherein the operational parameters of the small cell include: a cell index, a working band index, a working channel index, and a working bandwidth.

13. The apparatus according to claim 1, wherein the apparatus further comprises:

a receiving unit configured to receive actual operational parameters reported by the small cell; and an updating unit configured to update an active low-power eNB list and related parameters pre-stored by the eNB according to the actual operational parameters.

14. A communication apparatus at an unlicensed band, applicable to a small cell connected to an eNB, the apparatus comprising:

a receiving unit configured to receive request information requesting to measure a candidate channel on the unlicensed band transmitted by the eNB;

a measuring unit configured to measure the candidate channel on the unlicensed band requested by the eNB according to the request information, and report a measurement result to the eNB; and a negotiating unit configured to negotiate with the eNB for operational parameters of the small cell, so that the small cell powers on to work according to the negotiated operational parameters.

15. The apparatus according to claim 14, wherein the measurement result is an energy intensity on the candidate channel.

16. The apparatus according to claim 14, wherein the measuring unit reports the measurement result to the eNB via an X2 interface between the eNB and the small cell.

17. The apparatus according to claim 14, wherein the apparatus further comprises:

a reporting unit configured to report actual operational parameters of the small cell to the eNB, or when operational parameters of the small cell change, report the actual operational parameters of the small cell to the eNB.

18. A communication apparatus at an unlicensed band, applicable to UE connected to an eNB, the apparatus comprising:

a receiving unit configured to receive request information requesting to measure a candidate channel on the unlicensed band transmitted by the eNB;

a measuring unit configured to measure the candidate channel on the unlicensed band requested by the eNB according to the request information, and report a measurement result to the eNB.

19. The apparatus according to claim 18, wherein the measurement result is an energy intensity on the candidate channel.

20. The apparatus according to claim 18, wherein the measuring unit reports the measurement result to the eNB via an air interface between the eNB and the UE.

* * * * *